(12) United States Patent
Hubbard et al.

(10) Patent No.: US 11,999,425 B2
(45) Date of Patent: Jun. 4, 2024

(54) STEERING WHEEL ACTUATION DEVICE AND METHOD FOR VEHICLE TESTING

(71) Applicant: Anthony Best Dynamics Ltd., Wiltshire (GB)

(72) Inventors: Matthew James Hubbard, Bradford-on-Avon (GB); Tin Wah Chiu, Bath (GB); Andrew Pick, Bradford-on-Avon (GB); Colin Martin, Bath (GB)

(73) Assignee: Anthony Best Dynamics Ltd., Wiltshire (GB)

( * ) Notice: Subject to any disclaimer, the term of this patent is extended or adjusted under 35 U.S.C. 154(b) by 0 days.

(21) Appl. No.: 17/358,424

(22) Filed: Jun. 25, 2021

(65) Prior Publication Data

US 2021/0403084 A1  Dec. 30, 2021

(30) Foreign Application Priority Data

Jun. 25, 2020  (GB) ..................... 2009715

(51) Int. Cl.
| | | |
|---|---|---|
| *B62D 6/00* | (2006.01) | |
| *B62D 1/183* | (2006.01) | |
| *B62D 15/02* | (2006.01) | |

(52) U.S. Cl.
CPC ............. *B62D 6/008* (2013.01); *B62D 1/183* (2013.01); *B62D 15/025* (2013.01)

(58) Field of Classification Search
CPC ...... B62D 6/008; B62D 1/183; B62D 15/025; B62D 1/00; G01M 17/06; B60S 5/00

USPC ......................................................... 180/444
See application file for complete search history.

(56) References Cited

U.S. PATENT DOCUMENTS

| | | | |
|---|---|---|---|
| 3,465,577 A | | 9/1969 | Donovan |
| 3,648,539 A | * | 3/1972 | Rouis ....................... B62D 1/00 74/494 |
| 7,628,239 B1 | * | 12/2009 | Louie ....................... B62D 1/00 701/2 |
| 2016/0377508 A1 | | 12/2016 | Perrone et al. |
| 2019/0041847 A1 | * | 2/2019 | Silberling ............ B62D 15/025 |

FOREIGN PATENT DOCUMENTS

| | | | |
|---|---|---|---|
| CN | 107962575 A | | 4/2018 |
| CN | 111175058 A | | 5/2020 |
| DE | 3303588 A | * | 8/1983 ............ B60T 17/223 |

(Continued)

OTHER PUBLICATIONS

Great Britain Search Report issued in Great Britain Application No. 2009715.0, dated Mar. 19, 2021, one page.

(Continued)

*Primary Examiner* — Scott A Reinbold
(74) *Attorney, Agent, or Firm* — Sterne, Kessler, Goldstein & Fox P.L.L.C.

(57) ABSTRACT

A steering wheel actuation device, for example in ADAS testing, is provided. The actuation device can include a steering wheel actuator to selectively move during testing between an engaged configuration and a disengaged configuration. The actuation device can impart an actuation force to a vehicle steering wheel in the engaged configuration, and can vary the magnitude of the resistance it creates to the turning of the steering wheel during testing.

12 Claims, 4 Drawing Sheets

(56) References Cited

FOREIGN PATENT DOCUMENTS

DE         3303588 A1    8/1983
WO      94/20340 A1    9/1994

OTHER PUBLICATIONS

Extended European Search Report issued in European Application No. 21181298.7, dated Nov. 23, 2021, 19 pages.
EZ-Steer Catalog, CMP Group Ltd., published May 12, 2020, 16 pages.
1 Great Britain Examination Report issued in Great Britain Application No. 2009715.0, dated Jul. 26, 2023; 5 pages.

* cited by examiner

STEERING WHEEL ACTUATION DEVICE AND METHOD FOR VEHICLE TESTING

CROSS-REFERENCE TO RELATED APPLICATION

The present application claims priority to GB Application No. 2009715.0, filed on Jun. 25, 2020, which is incorporated herein by reference in its entirety.

BACKGROUND

The present invention relates to a steering wheel actuation device, for use in steering a vehicle in vehicle testing, including but not limited to, the testing of Advanced Driver Assistance Systems (ADAS). The present invention also relates to a vehicle for testing comprising the steering wheel actuation device and to a method of steering a vehicle during a vehicle test using a steering wheel actuation device.

Many modern vehicles now include Advanced Driver Assistance Systems (ADAS) for increasing vehicle safety. To test ADAS in vehicles, it is desirable to replicate real-world scenarios in a consistently repeatable manner, and to measure how the ADAS reacts. In ADAS testing, a steering wheel actuator may be used to control a steering wheel of a vehicle, to steer the vehicle so as to follow a predetermined path or maneuver.

Increasingly, ADAS are configured to sense if a driver's hands are on or off the steering wheel. If the ADAS senses that the driver's hands are off the steering wheel then it may, for example, be arranged to issue an alert and/or the ADAS may react differently to how it reacts when the driver's hands are on the steering wheel. In some ADAS, the system may be arranged to measure how firmly the driver is gripping the steering wheel.

Current steering wheel actuators, used in vehicle testing, including ADAS testing, typically have an impact on the inertia of the steering wheel. It has been identified that they are therefore unable to fully simulate when a driver's hands are off the steering wheel, even when they provide no resistive force as such. They are also unable to simulate how firmly the driver is gripping the steering wheel.

The present invention seeks to address or mitigate at least some of the above mentioned problems. Alternatively, or additionally, the present invention seeks to provide an improved steering wheel actuation device for steering a vehicle in vehicle testing. Alternatively, or additionally, the present invention seeks to provide an improved vehicle for vehicle testing. Alternatively, or additionally, the present invention seeks to provide an improved method of steering a vehicle during a vehicle test.

BRIEF SUMMARY

According to a first aspect of the invention there is provided a steering wheel actuation device, for steering a vehicle in vehicle testing, the actuation device comprising:
 a steering wheel actuator;
 wherein the steering wheel actuator is selectively moveable during testing between an engaged configuration for imparting an actuation force to a vehicle steering wheel and a disengaged configuration.

As the steering wheel actuator is selectively moveable, during testing, between the engaged and disengaged configurations, it can be selectively moved to the engaged configuration to steer the vehicle (during testing) or to the disengaged configuration to simulate a driver taking their hands off the steering wheel (for example, in embodiments in which the testing is ADAS testing, to test how the ADAS responds). It will be understood that when the steering wheel actuator is in its disengaged configuration it is not able to impart any actuation force to the steering wheel, as a result of being moved out of contact, for example. In the disengaged configuration, the steering wheel actuator may therefore have no influence on the inertia of the steering wheel, thereby accurately modelling the driver's hands being off the wheel. In the disengaged configuration, there is preferably no part of the steering wheel actuator connected to, or otherwise influencing, the steering wheel. When the steering wheel actuator is in the disengaged configuration, the steering wheel may be in its default, non-testing, form (for example, the steering wheel may be in its form as intended to be sold and used with the vehicle). The engaged configuration may be an engaged position. The disengaged configuration may be a disengaged position. In the disengaged position the steering wheel actuator may be remote from the steering wheel. When the steering wheel actuator is in the disengaged position, the steering wheel preferably remains operable (for example, the steering wheel preferably remains coupled to the steering column and the steering shaft).

Embodiments of the invention are applicable to vehicle testing. The vehicle testing may be vehicle system testing (e.g. testing of system(s) on the vehicle). The testing is more preferably ADAS testing. In some embodiments, the testing may be dynamics testing. In some embodiments the testing may be durability testing. The vehicle may be a non-autonomous vehicle (e.g. a manually-driven car). In some embodiments, the vehicle may be autonomous or semi-autonomous.

Optionally the steering wheel actuator is movably mounted such that, during testing, it is selectively moveable between the engaged and disengaged configurations. Furthermore, this may allow the selective engagement and disengagement to be automated, for example using an engagement actuator (see below), which is particularly advantageous for use during testing where fast and accurate control of the engagement and disengagement may be required in certain tests. The steering wheel actuator may be mounted at a location remote from the steering wheel.

The steering wheel actuator may be mounted on an arm that is movably mounted such that, during testing, the arm is movable to move the steering wheel actuator between the engaged and disengaged configurations.

When the steering wheel actuator is in the engaged configuration, it may, in principle, contact any part of the steering wheel such that it actuates the steering wheel. In preferred embodiments, the steering wheel actuator contacts the steering wheel rim. This is particularly advantageous, as this is where a driver would typically place their hands to steer the wheel.

The steering wheel actuation device may be configured such that, when the steering wheel actuator is in the engaged configuration, it is for imparting the actuation force to the steering wheel by means of a frictional force. This may facilitate a convenient way of engaging and disengaging the actuator with the steering wheel, for example by moving the actuator into and out of contact with the steering wheel. The steering wheel actuation device may be configured to provide automated engagement and disengagement of the actuator from an engaged configuration wherein the steering wheel actuator contacts the steering wheel, to a disengaged configuration wherein the steering wheel actuator is remote from the steering wheel.

This may be by means of a frictional force (e.g., only a frictional force). In this respect, the steering wheel actuation device may be configured such that when the steering wheel actuator is in the engaged configuration it is not fixedly attached to the steering wheel.

The steering wheel actuator may be arranged to impart the actuation force to the steering wheel by a rolling contact with the steering wheel. In this respect, the steering wheel actuator may comprise a drivable rolling surface for contacting the steering wheel to impart the actuation force to the steering wheel.

Optionally the steering wheel actuator is conformable to the shape of a steering wheel that it is in contact with. This may allow the steering wheel actuation device to be used with steering wheels of different shapes. For example, the steering wheel actuator may have one or more contact surfaces, which are conformable to the shape of a steering wheel with which the actuator is in contact. The one or more contact surfaces may comprise a resilient material. Such a resilient material may deform to mould to the shape of the steering wheel rim in the engaged configuration. The one or more contact surfaces may comprise a relatively thin sheet comprising a flexible material. Such a sheet may flex to conform to the shape of the steering wheel rim, for example wrapping around the steering wheel rim, in the engaged configuration. Alternatively or in addition, the one or more contact surfaces may be arranged to make contact with the steering wheel over a relatively large surface area in the engaged configuration. For example, the one or more contact surfaces may be arranged to make contact with the steering wheel over ~4-5% of the outer circumference of the steering wheel in the engaged configuration.

In some embodiments, the steering wheel actuator may comprise a belt. The belt may extend over a plurality of, spaced apart, rotary members. This may provide an effective means of imparting the force to the steering wheel in a relatively uniformly distributed way. This may also provide a relatively reliable and convenient way of selectively engaging the disengaging a steering wheel. The belt and rotary members may be arranged so that the tension in the belt is low enough that the belt has a flexibility such that it can conform to the shape of the portion of the steering wheel that it is in contact with, when in the engaged configuration.

In some embodiments, the steering wheel actuator may comprise a plurality, or a multiplicity, of rollers for engaging the steering wheel. The rollers may be biased towards an extended position such when engaging the steering wheel, each roller is urged against the surface of the steering wheel by a respective biasing force. The multiplicity of rollers may be conformable to the shape of a steering wheel with which the actuator is in contact.

Optionally the actuation device comprises an engagement actuator configured to move the steering wheel actuator between its engaged and disengaged configurations.

In the engaged configuration, the steering wheel actuator may be biased against the steering wheel. For example, the actuation device may comprise a biasing member configured to bias the steering wheel actuator against the steering wheel. In the engaged configuration, the steering wheel actuator may be moveable, for example rotatable, about a joint. The biasing member may be arranged to bias the steering wheel actuator about the joint. Such an arrangement may enable the steering wheel actuator to remain in contact with a non-circular steering wheel as that steering wheel rotates.

The actuation device may comprise a control unit. The control unit may be configured to control the engagement actuator so as to control the movement of the steering wheel actuator between its engaged and disengaged configurations. The control unit may enable automated selective engagement and disengagement of the actuator, for example between an engaged configuration wherein the steering wheel actuator contacts the steering wheel, to a disengaged configuration wherein the steering wheel actuator is remote from the steering wheel. The control unit may be configured to control the engagement actuator so as to control the pressure exerted by the steering wheel actuator on the steering wheel, in the engaged configuration. The engagement actuator may comprise a linear actuator to which the control unit is connected. The control unit may control the linear actuator to automate selective movement between the engaged and disengaged configurations.

Alternatively, or additionally, the control unit may be configured to control the steering wheel actuator, in its engaged configuration, so as to control the actuation of the steering wheel.

Optionally the actuation device is configured such that the steering wheel actuator can engage the steering wheel to provide a variety of different levels of resistance to turning of the steering wheel. Such an arrangement may enable the actuation device, in the engaged configuration, to simulate different grip strengths by a driver. The steering wheel actuator may be configured to be urged against the steering wheel at differing biasing forces (for example via a biasing member or an actuator), to provide the corresponding variety of different levels of resistance to turning of the steering wheel.

Optionally the steering wheel actuator, in the engaged configuration, is arranged to contact the steering wheel rim. The steering wheel rim may be substantially circular. The steering wheel rim may be substantially non-circular.

According to a second aspect of the invention there is provided a steering wheel actuation device, for steering a vehicle in vehicle testing, for example ADAS testing, the actuation device comprising:

a steering wheel actuator for imparting an actuation force to a vehicle steering wheel;

wherein the actuation device is also configured to vary the magnitude of the resistance it creates to the turning of the steering wheel during testing.

This may allow for testing of a vehicle system that measures, or is otherwise impacted by, how firmly the driver is gripping the steering wheel, because the steering wheel actuation device can simulate that gripping force by varying the magnitude of the resistance it creates to the turning of the steering wheel.

Optionally the steering wheel actuator is movably mounted such that, during testing, it is movable to vary the magnitude of the resistance it creates to the turning of the steering wheel during testing. For example, the steering wheel actuator may be mounted on an arm that is movable to vary the pressure exerted by the steering wheel actuator on a steering wheel.

The steering wheel actuator may be configured to impart the actuation force to the vehicle steering wheel when it is in an engaged configuration, and to vary the contact pressure exerted by it on the steering wheel when it is in the engaged configuration. The steering wheel actuator may also be moveable to a disengaged configuration. In the disengaged configuration, the steering wheel actuator may no longer be in contact with the steering wheel.

According to a third aspect of the invention there is provided a vehicle for testing, the vehicle comprising a steering wheel and a steering wheel actuation device according to either of the first or second aspects of the invention arranged to actuate the steering wheel during testing.

According to a fourth aspect of the invention there is provided a method of steering a vehicle during a test, for example an ADAS test, using a steering wheel actuation device, wherein the method comprises:

engaging a steering wheel actuator with the steering wheel of the vehicle;

imparting an actuation force, from the steering wheel actuator, to the steering wheel to steer the vehicle; and disengaging the steering wheel actuator from the steering wheel.

According to a fifth aspect of the invention there is provided a method of steering a vehicle during a test, for example an ADAS test, using a steering wheel actuation device, wherein the method comprises:

engaging a steering wheel actuator with the steering wheel of the vehicle and imparting an actuation force, from the steering wheel actuator, to the steering wheel to steer the vehicle; and with the steering wheel actuator engaged with the steering wheel, varying the magnitude of the resistance it creates to the turning of the steering wheel during testing, for example by varying the pressure exerted by the steering wheel actuator on the steering wheel.

It will be appreciated that features described in relation to one aspect of the present invention may be incorporated into other aspects of the present invention. For example, the method of any aspect of the invention may incorporate any of the features described with reference to the apparatus of any aspect of the invention and vice versa. In preferred embodiments of the invention, the testing is ADAS testing. Unless otherwise specified, features described herein with reference to ADAS testing may be applicable to embodiments for other testing (e.g. systems, dynamics and/or durability testing), and vice versa.

Other preferred and advantageous features of the invention will be apparent from the following description.

BRIEF DESCRIPTION OF THE DRAWINGS/FIGURES

Embodiments of the present invention will now be described by way of example with reference to the drawings of which:

DETAILED DESCRIPTION

Referring to FIGS. 1 to 4 there is shown a steering wheel actuation device 1, according to an embodiment of the invention, and a steering wheel 2 of a vehicle that is undergoing testing of its Advanced Driver Assistance Systems (ADAS).

In the currently described embodiment, the vehicle is a four-wheeled car. However, it will be appreciated that the steering wheel actuation device 1 may be used with any type of steerable vehicle, to steer the vehicle in ADAS testing, or other vehicle testing.

Figure 1:
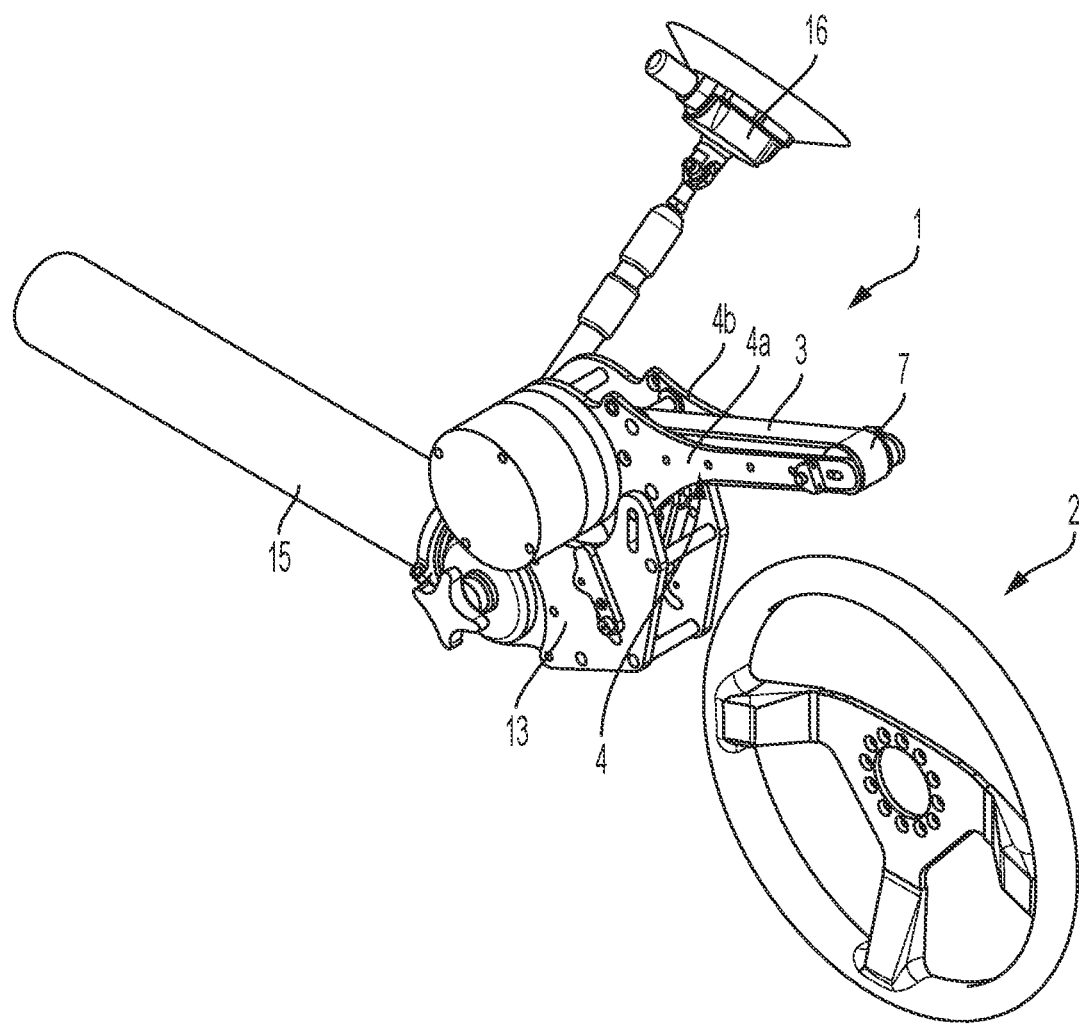
FIG. 1 shows a perspective view of a steering wheel actuation device, according to an embodiment of the invention, and of a steering wheel, where a steering wheel actuator, of the device, is in a disengaged configuration.
Figure 2:
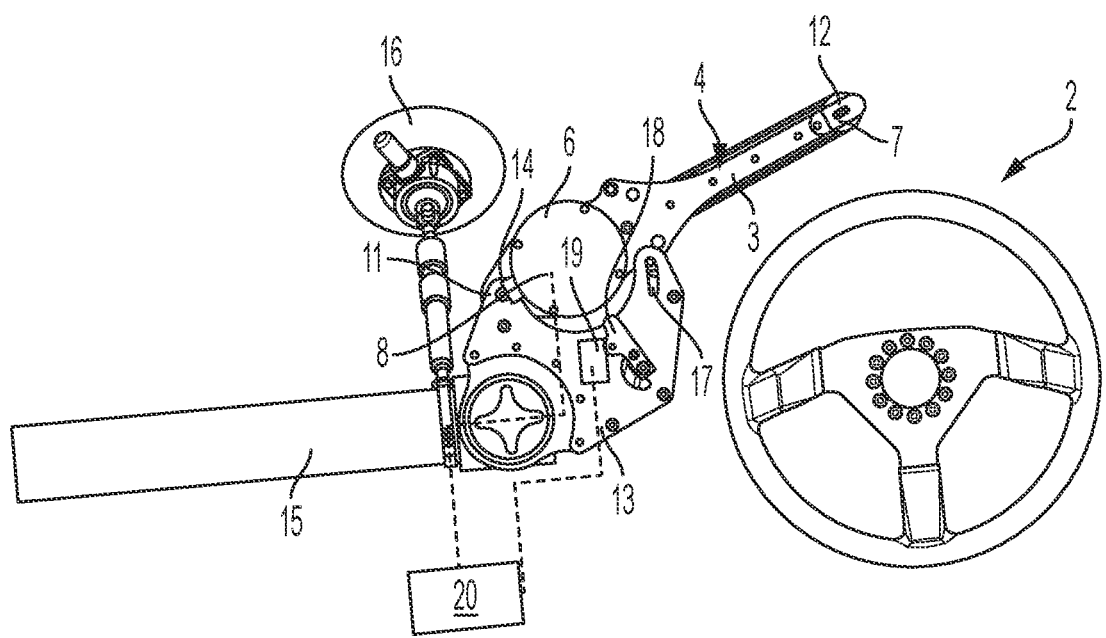
FIG. 2 is a front view of the steering wheel actuation device, where the steering wheel actuator is in the configuration shown in FIG. 1, and FIGS. 3 and 4 are views corresponding to those of FIGS. 1 and 2 but where the steering wheel actuator is in an engaged configuration.

The steering wheel actuation device 1 comprises a steering wheel actuator, in the form of a belt 3, which is selectively moveable, during ADAS testing, between an engaged configuration (shown in FIGS. 3 and 4) for imparting an actuation force to the vehicle steering wheel 2, to steer the vehicle and a disengaged configuration (shown in FIGS. 1 and 2).

The actuation device 1 comprises an elongate mounting arm 4 that extends, in a longitudinal direction, from a first end 11 to a second 12 (see FIG. 2), with first and second rollers 6, 7 rotatably mounted to the arm 4, towards the first and second ends 11, 12 of the arm 4, respectively.

The arm 4 comprises first and second laterally spaced plates 4a, 4b, with the rollers 6, 7 rotatably mounted between the plates 4a, 4b. Each roller 6, 7 is mounted on a respective shaft received in aligned apertures in the plates 4a, 4b such that the roller 6, 7 is rotatable about an axis that is parallel to the lateral direction of the arm 4.

The belt 3 is elongate and mounted on the rollers 6, 7. The belt 3 passes in a longitudinal direction from the first roller 6 to the second roller 7, around the second roller 7 back to the first roller 6 and around the first roller 6 to form an endless loop. In this respect, the belt 3 is an endless conveyor belt that is mounted on the rollers 6, 7, so as to rotate as the rollers 6, 7 rotate.

The first roller 6 is rotatably driven by an electric motor 8 (see FIG. 2) so as to drive the belt 3 in the longitudinal direction. The electric motor 8 is drivable in both rotational directions so as to drive the belt 3, and therefore the steering wheel 2, in both rotational directions (as described below).

The arm 4 is pivotally mounted at its first end 11, by a rotational joint 14, to a mounting frame 13. The mounting frame 13 is attached to an end of a support rod 15, which is mounted, via a suction cup attachment 16, to a support structure of the vehicle, such as the vehicle windscreen, so as to react the forces produced by the steering wheel actuator 3, in use.

Figure 3:
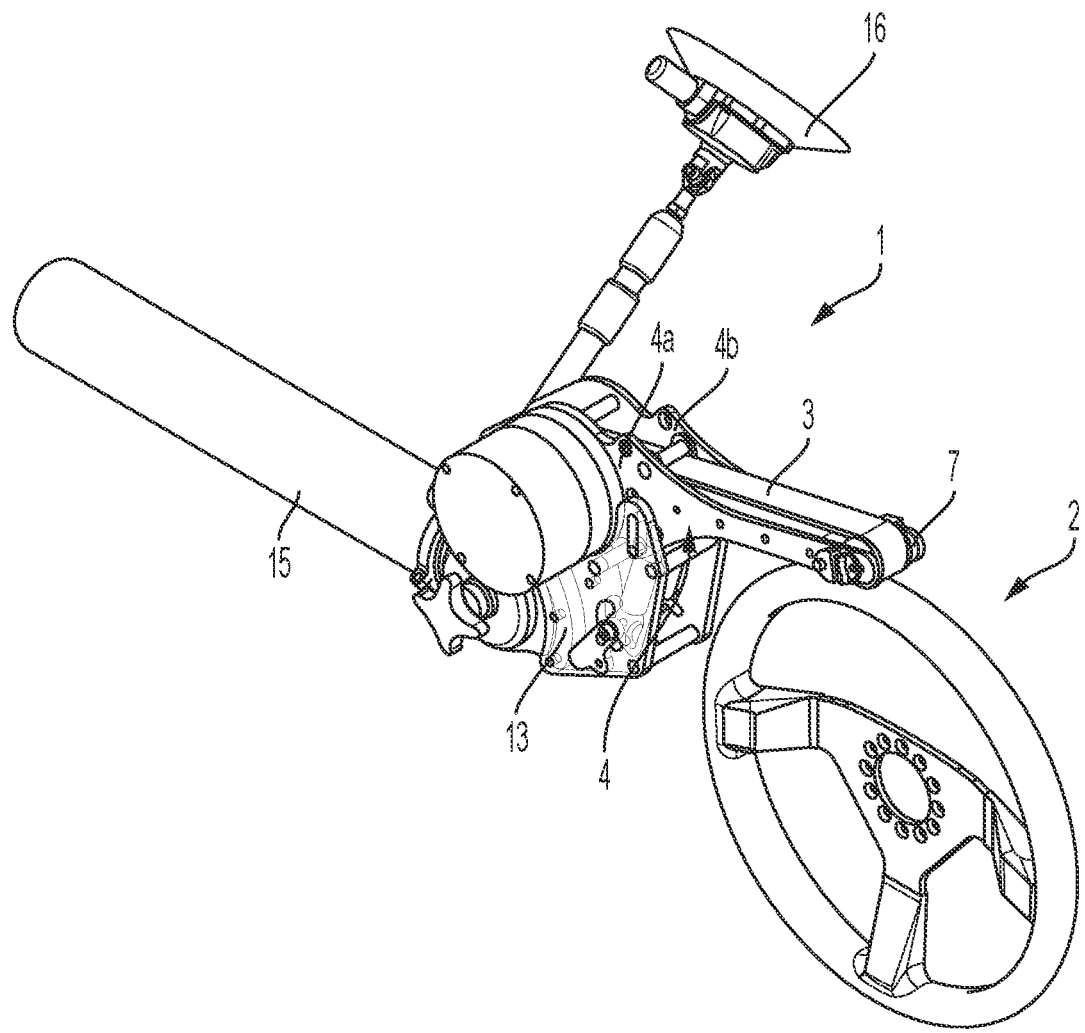
Figure 4:
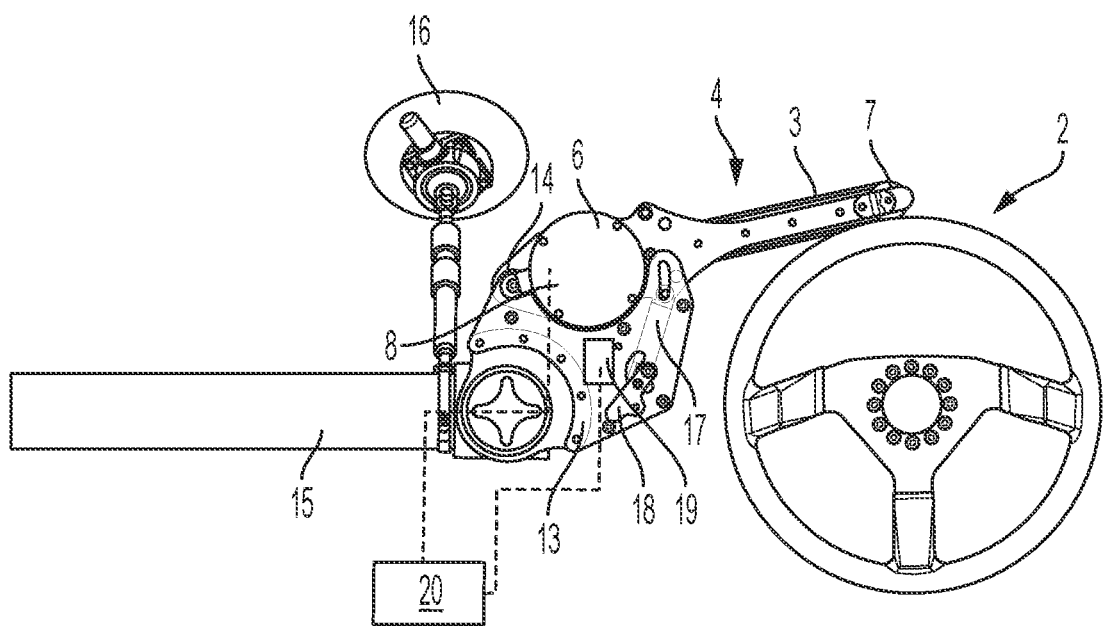

A linear actuator 19 (shown schematically in FIGS. 2 and 4, but not shown in FIGS. 1 and 3) is arranged to rotate the arm 4, about the rotational joint 14, so as to rotate the belt 3 between a disengaged configuration (shown in FIGS. 1 and 2) and an engaged configuration (shown in FIGS. 3 and 4).

In this respect, a first end of the linear actuator 19 is mounted to the frame 13 and a second end of the linear actuator 19 is connected to the pivoted lever arm 18. The lever arm 18 is attached to one end of a spring 17 (only partially visible in FIGS. 1 and 2, but shown fully in FIGS. 3 and 4, where the plate 13 is shown partially transparent). The opposite end of the spring 17 is attached to the underside of the arm 4, such that movement of the lever arm 18, by the linear actuator 19, pulls (via spring 17) the arm 4 towards the steering wheel 2 such that the steering wheel actuator presses against the steering wheel. This places the steering wheel actuator into the engaged configuration. The movement of the lever arm 18, and resulting movement of the steering wheel actuator on arm 4, is evident when comparing FIGS. 1 and 2, with FIGS. 3 and 4. In reverse, the actuator 19 rotates the lever arm 18 in the opposite direction, thereby pushing (via the spring 17) the arm 4 away from the steering wheel.

The linear actuator 19 connected to the lever arm 18 is connected to a control unit 20 (shown schematically in FIGS. 2 and 4), which is configured to control the linear actuator 19 so as to control the selective movement of the arm 4 and belt 3, during ADAS testing, between the engaged and disengaged configurations.

The control unit 20 is also configured to control the linear actuator 19 so as to controllably vary the contact pressure exerted by the belt 3 on the rim of the steering wheel 2, in the engaged configuration. This may allow for testing of an ADAS system that measures how firmly the driver is gripping the steering wheel 2, because the steering wheel actuation device 1 can simulate that gripping force, and the change in resistance to rotation, by varying the pressure exerted by the belt 3 on the steering wheel 2.

The control unit 20 is also configured to control the motor 8 so as to control the rotation of the belt 3, to control the steering of the wheel 2, when the belt 3 is engaged with the wheel 2 (described below).

In the currently described embodiment, the control unit 20 comprises a computer processing unit that is suitably programmed with software to automate the above control of the actuation device 1. However, it will be appreciated that the control may be achieved by means other than software. For example, a suitably arranged electronic circuit, whether or not comprising a programmable processing unit, could achieve an equivalent function. In some embodiments the control unit 20 may be omitted, with the actuation device 1 controlled manually, for example by a person sitting in the driver's seat. However, the use of an actuator 17 and control unit 20 to control the selective engagement of the belt 3 with the steering wheel 2, and to control the steering of the wheel 2 by the belt 3, is particularly advantageous for ADAS testing, where fast and accurate control may be required in certain tests.

When the belt 3 is in the engaged configuration it is positioned (by the rotational position of the arm 4) in rolling contact with the rim of the steering wheel 2. The frictional force between the contacting surfaces of the belt 3 and steering wheel rim imparts an actuation force to the steering wheel rim, which acts to rotate the steering wheel 2.

In this respect, the belt 3 is not fixedly attached to the steering wheel 2 and rotates the steering wheel 2 only by means of this frictional force. This is advantageous in that it provides a relatively simple way of selectively engaging and disengaging the belt 3 with the steering wheel 2, simply by moving the belt 3 into and out of contact with the steering wheel rim.

The belt 3 and rollers 6, 7 are arranged so that the tension in the belt 3 is low enough that the belt 3 is flexible enough to conform to the shape of the portion of the steering wheel rim that it is in contact with. This is advantageous in that it allows the steering wheel actuation device 1 to be used with steering wheels 2 of a variety of different shapes. The presence of the spring 17, and the rotational joint 14, also allows the arrangement to accommodate non-circular steering wheels. In that respect, when the steering wheel actuator is in the engaged configuration, the spring 17 biases the arm 4 towards the wheel (thereby ensuring contact is maintained when the local radius of the steering wheel rim, at the contact area, decreases), whilst the joint 14 also allows movement in reverse (thereby ensuring contact is maintained when the local radius of the steering wheel rim, at the contact area, increases).

When the belt 3 is in the disengaged configuration, the arm 4 is in a rotational position such that the belt 3 is not in contact with the steering wheel 2. In this position, the belt 3 is not able to impart any actuation force to the steering wheel 2. In the disengaged configuration the belt 3 may therefore have no influence on the inertia of the steering wheel 2. This is advantageous in that the belt 3 no longer adds any additional inertia to the steering wheel 2 and so the ADAS would interpret this as the driver having taken their hands off the wheel 2.

In summary, as the belt 3 is selectively moveable, during ADAS testing, between the engaged and disengaged configurations, it can be selectively moved to the engaged configuration to steer the vehicle (during ADAS testing) or to the disengaged configuration to simulate a driver taking their hands off the steering wheel 2, to test how the ADAS responds. Also, the actuation device 1 can vary the contact pressure exerted by the belt 3 on the rim of the steering wheel 2, to adjust the resistance to rotation exhibited by the steering wheel. This may be used to test a system that is influenced by, or measures, how firmly the driver is gripping the steering wheel 2.

Whilst the present invention has been described and illustrated with reference to particular embodiments, it will be appreciated by those of ordinary skill in the art that the invention lends itself to many different variations not specifically illustrated herein.

For example, in the described embodiment, the belt 3 is mounted on an arm 3 that is rotated to move the belt 3 between its engaged and disengaged configurations. Alternatively, or additionally, the belt 3 may be movably mounted such that it translates between its engaged and disengaged configurations.

In the described embodiment, the steering wheel actuator is a belt 3. However, it will be appreciated that any suitable type of steering wheel actuator may be used. For example, the steering wheel actuator may comprise a plurality, or a multiplicity, of rollers for engaging the steering wheel. The rollers may be biased towards an extended position such when engaging the steering wheel, each roller is urged against the surface of the steering wheel by a respective biasing force. The multiplicity of rollers may be conformable to the shape of a steering wheel with which the actuator is in contact.

In the described embodiment, when the belt 3 is in the engaged configuration it contacts the rim of the steering wheel 2. It may, in principle, contact any part of the steering wheel such that it actuates the steering wheel. However, contacting the rim is particularly advantageous, as this is where a driver would typically place their hands to steer the wheel 2.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

What is claimed is:

1. A steering wheel actuation device, for steering a vehicle in ADAS testing, the actuation device comprising:
    a steering wheel actuator, the steering wheel actuator comprising a belt extending over a plurality of spaced apart rollers,
    wherein the steering wheel actuator is mounted on an arm that is movably mounted such that, during testing, the arm is movable to move the steering wheel actuator between an engaged configuration for imparting an actuation force to a vehicle steering wheel and a disengaged configuration, wherein the steering wheel actuator is moveable about a joint and the steering wheel actuation device comprises a biasing member, the biasing member being arranged to bias the steering wheel actuator about the joint, to bias the steering wheel actuator against the vehicle steering wheel, wherein the steering wheel actuator is conformable to the shape of the vehicle steering wheel that it is in contact with so that the steering wheel actuation device can be used with steering wheels of different shapes, the belt of the steering wheel actuator contacting a rim of the vehicle steering wheel, in the engaged configuration, and the belt being conformable to the shape of the rim, and wherein the belt is not in contact with the rim of the vehicle steering wheel when the steering wheel actuator is in the disengaged configuration.

2. The steering wheel actuation device of claim 1, further comprising:
an engagement actuator configured to move the steering wheel actuator between the engaged and disengaged configurations.

3. The steering wheel actuation device of claim 2, further comprising:
a control unit configured to control the engagement actuator so as to control the movement of the steering wheel actuator between the engaged and disengaged configurations.

4. The steering wheel actuation device of claim 3, wherein the control unit is configured to control the steering wheel actuator, in the engaged configuration, so as to control the actuation of the vehicle steering wheel.

5. The steering wheel actuation device of claim 1, wherein the steering wheel actuation device is configured such that the steering wheel actuator can engage the vehicle steering wheel to provide a variety of different levels of resistance to turning of the vehicle steering wheel.

6. The steering wheel actuation device of claim 1, wherein the steering wheel actuation device is configured to vary a magnitude of a resistance it creates to turning of the vehicle steering wheel during testing.

7. The steering wheel actuation device of claim 6, wherein the arm is movably mounted such that, during testing, it is movable to vary a pressure exerted by the steering wheel actuator on the vehicle steering wheel.

8. A vehicle for vehicle testing, the vehicle comprising the vehicle steering wheel and the steering wheel actuation device of claim 1 arranged to actuate the vehicle steering wheel during testing.

9. A vehicle for vehicle testing, the vehicle comprising the vehicle steering wheel and the steering wheel actuation device of claim 6 arranged to actuate the vehicle steering wheel during testing.

10. A method of steering a vehicle during an ADAS test, using a steering wheel actuation device, the method comprising:
engaging a steering wheel actuator with a steering wheel of the vehicle, the steering wheel actuator comprising a belt extending over a plurality of spaced apart rollers;
imparting an actuation force, from the steering wheel actuator, to the steering wheel to steer the vehicle; and
disengaging the steering wheel actuator from the steering wheel;
wherein the steering wheel actuator is mounted on an arm that is movably mounted such that, during testing, the arm is movable to move the steering wheel actuator between an engaged configuration for imparting the actuation force and a disengaged configuration,
wherein the steering wheel actuator is moveable about a joint and the steering wheel actuation device comprises a biasing member, the biasing member being arranged to bias the steering wheel actuator about the joint, to bias the steering wheel actuator against the steering wheel,
wherein the steering wheel actuator is conformable to the shape of the steering wheel that it is in contact with so that the steering wheel actuation device can be used with steering wheels of different shapes, the belt of the steering wheel actuator contacting a rim of the steering wheel, in the engaged configuration, and the belt being conformable to the shape of the rim, and
wherein the belt is not in contact with the rim of the steering wheel when the steering wheel actuator is in the disengaged configuration.

11. The method of claim 10, comprising:
with the steering wheel actuator engaged with the steering wheel, varying a magnitude of a resistance the steering wheel actuator creates to turning of the steering wheel during testing.

12. The method of claim 11, wherein varying the magnitude of the resistance includes varying a pressure exerted by the steering wheel actuator on the steering wheel.

* * * * *